July 25, 1939.　　R. G. GRIFFITH　　2,167,505
TRANSLATING MECHANISM
Filed April 6, 1935　　2 Sheets-Sheet 1
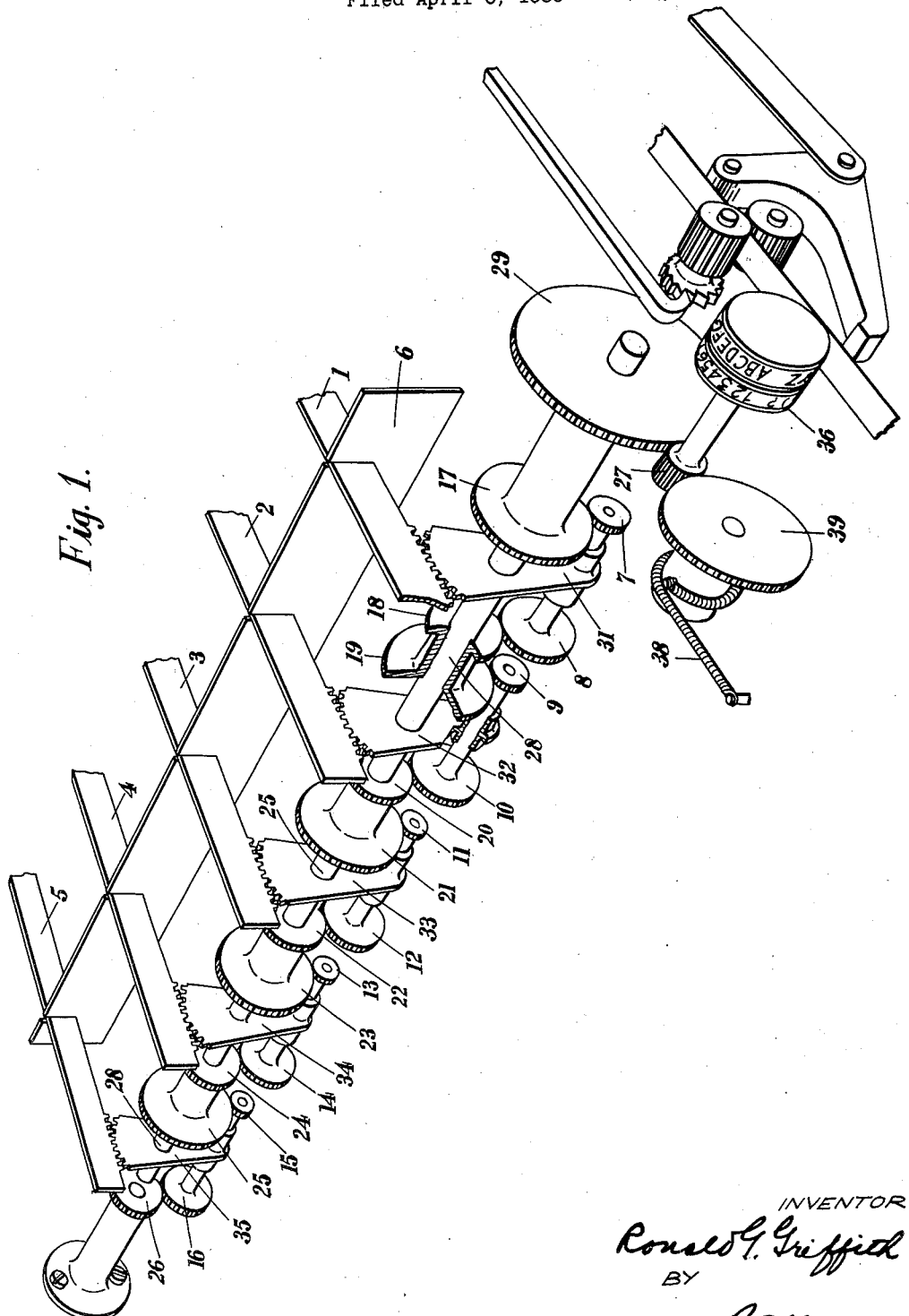
INVENTOR
Ronald G. Griffith
BY
R. C. Hopgood
ATTORNEY July 25, 1939.   R. G. GRIFFITH   2,167,505
TRANSLATING MECHANISM
Filed April 6, 1935   2 Sheets-Sheet 2
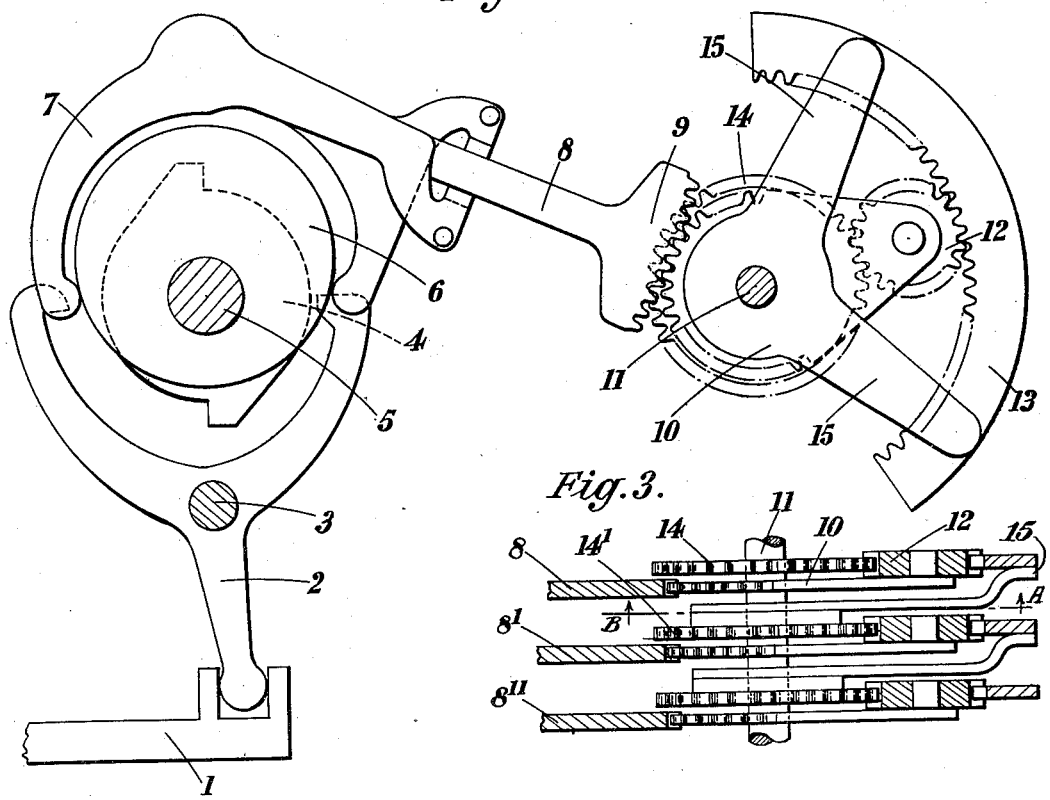
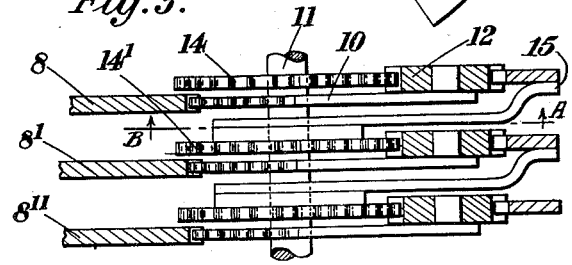
INVENTOR
Ronald G. Griffith
BY R.C. Hopgood
ATTORNEY Patented July 25, 1939

2,167,505

UNITED STATES PATENT OFFICE 2,167,505

TRANSLATING MECHANISM

Ronald George Griffith, Upper Warlingham, England, assignor to Creed and Company Limited, Croydon, Surrey, England, a British company Application April 6, 1935, Serial No. 15,051
In Great Britain April 9, 1934

1 Claim. (Cl. 178—34)

This invention relates to telegraph reproducing apparatus in which individual characters are selected by the positioning of an indicating shaft in accordance with the setting of impulse recording members.

According to the invention the movement of each of a plurality of impulse recording members is transmitted to an indicating shaft by means of epicyclic gearing.

The invention is particularly useful as applied to selecting devices in which the movement of an indicating device is the aggregate of a number of separate movements, and thus in accordance with the invention the movement of each of a plurality of impulse recording members is transmitted to a common indicating shaft by means of epicyclic gearing in such a manner that the movement of the indicating shaft is an aggregation of the movement of each of the impulse recording members.

In aggregate motion selectors, selection is made by successively dividing a total number of selections in accordance with the possible number of kinds of current impulses. For example, if two kinds of current impulses only are employed (counting zero current as one kind of impulse) the total number of selections is successively halved for each element until the final selection is made. Thus if there are 32 positions of the indicating shaft, the first element may select one half thereof and may determine whether the shaft is to remain stationary to select the first sixteen characters, or rotate through a half revolution to select the next sixteen characters. Successive following elements may then determine one quarter, one eighth, one sixteenth and finally one thirty-second of a revolution of the indicating shaft. The particular order in which the different fractions of a revolution are determined does not affect the principle of selection and only has effect upon the order in which the characters are placed round the indicating shaft. The essential point is however that for each element the rotation of the indicating shaft shall be independent of that determined by each other element but that all the rotations shall be cumulative.

The invention provides an aggregate motion selector in which each of a plurality of members positioned in accordance with the successive elements of a received signal rotates an indicating shaft by an amount characteristic of the particular signal element by means of epicyclic gearing.

The different selecting members may be given an amount of movement characteristic of the particular signal elements but it is preferable that each selecting member should be given the same amount of movement, so that in a two-current system it has two positions only and is moved into one or other of these positions according to the character of the received signal element. The degree of rotation characteristic of the particular element that is to be given to the indicating shaft is then determined by the gearing connecting the element to the shaft. Preferably also the gearing connecting all the selecting members with the indicating shaft is formed into one compound train of gear wheels, all in constant mesh, one endmost wheel constituting the character positioning member, and the extreme wheel at the other end of the gear train either being held stationary during the translating operation or being driven so as to have a predetermined amount of movement about its axis during and/or between consecutive translating operations. The impulse recording members are arranged to impart motion to different intermediate wheels of the gear train so that the motions are transmitted through the intermediate gear wheels to the character positioning members. Due to the gear ratios in the different sections of the gearing a given amplitude of movement of the different impulse recording members transmits different amplitude of movement to the character positioning member.

A more particular description of the invention and the manner in which it operates is set forth in connection with the accompanying drawings in which Figure 1 illustrates one apparatus for accomplishing the results desired, Figure 2 represents a modification of the preferred form of gearing shown in Figure 1 in a view taken along the line AB of Figure 3 and Figure 3 illustrates a side view of several gearing mechanisms such as shown in the right hand portion of Figure 2.

One manner in which the invention may be performed is shown in Figure 1 of the accompanying drawings.

Upon a shaft 28 a plurality of sun wheels, arranged in pairs is rotatably mounted. 17 and 18 constitute one pair, and the other pairs are 19 and 20, 21 and 22, 23 and 24, 25 and 26. The two wheels of each pair are of different diameter and relatively rotatable. A planetary element cooperates with each pair of sun wheels, each of said elements consisting of a pair of toothed wheels of different diameters rigidly fixed to or solid with one another and meshing with the respective sun wheels of a corresponding pair. Planet wheels 7 and 8 mesh with sun wheels 17 and 18, planet wheels 9 and 10 with sun wheels 19 and 20, planet wheels 11 and 12 with sun wheels 21 and 22, planet wheels 13 and 14 with sun wheels 24 and 25 and finally planet wheels 15 and 16 mesh with sun wheels 25 and 26 respectively. The respective pairs of planet wheels are carried by toothed sectors 31, 32, 33, 34 and 35 freely movable around the shaft 28. Each toothed sector with its two planet wheels and associated sun wheels constitutes a complete epicyclic gear unit. The apparatus illustrated is adapted to receive code combinations on the well known five unit code, and consequently there are five such gear units. Each gear unit transmits the motion of an impulse recording member, five of which 1, 2, 3, 4 and 5, are shown to a character positioning member 29. For this purpose each impulse recording member is shown as provided with teeth meshing with the teeth of the corresponding toothed sector.

The impulse recording members 1, 2, 3, 4 and 5 are slidable in a comb 6 and are adapted to be moved a definite amount to left or right in accordance with the character of successive elements of a received signal. This movement may be effected in any well known manner. For example, the impulse recording members 1, 2, 3, 4 and 5 may be moved by individual electromagnets operated successively in any well known manner, or they may be moved by cam means in accordance with the positions of the armature of a single electromagnet in successive signal elements.

The sun wheels of each complete gear unit are solid with or rigidly coupled with the sun wheels of the adjacent gear units. In the case of the final gear unit one of the sun wheels is connected directly to the character positioning member, and in the case of the first gear unit one of the sun wheels is prevented from moving.

The sun wheel 17 is directly connected with a character positioning member 29 so that the latter is rotated with any rotation of the sun wheel. Movement of the impulse recording member to the left or right is thus transmitted directly through its corresponding epicyclic gear unit to cause clockwise or anticlockwise rotation of the member 29. The sun wheel 18 is rigidly coupled with the sun wheel 19, sun wheel 20 with sun wheel 21 and so on, until finally sun wheel 26 is held rigid.

In the simple form shown the gear ratio obtained through each planetary element gives a reduction ratio from one gear unit to the next in the direction of the character positioning member 29 which is made 2:1. Thus movements of members 1, 2, 3, 4 and 5 produce a revolution of member 29 in the proportion of 16, 8, 4, 2 and 1. If any two or more impulse recording members are actuated simultaneously or in immediate succession, the angular motion imparted to the member 29 will be the sum of the angular motions imparted by the individual members operated.

The character positioning member 29 drives a type-wheel 36 through a gear wheel 37 giving a step-up ratio.

It has been found that a train of epicyclic gears as described has a considerable advantage over previous aggregate motion selector mechanisms in that back lash is reduced to a minimum. If it be desired, however, to introduce additional means to prevent or minimize back lash, this may take the form of a spring 38 operating on the character positioning member 29 either directly or as shown through a gear wheel 39.

The final sun wheel 26 has been shown as fixed, but it is to be understood that means may be provided for giving a complete revolution to the typewheel between consecutive translating operations to ensure of all the characters being inked and this may be effected by rotation of the sun wheel 26. Alternatively an extra gear unit may be introduced for the purpose.

Figs. 2 and 3 of the accompanying drawings illustrate a modified and preferred form of the gearing shown in Figure 1. Figure 2 also shows the preferred manner in which the movement of a bar 1 by the armature of the receiver magnet may be transferred to a gear unit.

A double armed detent lever 2 pivoted at 3 has one end thereof resting in a slot in the bar 1. The two arms of the lever 2 cooperate with a detent 4 attached to a cam 6 on a shaft 5. The cam 6 and detent 4 tend to be driven through a friction clutch in a well known manner but are held stationary by the detent lever 2. Upon rotation of cam 6, detent 4 is brought into engagement with the right hand projection of detent lever 2, stopping the rotation of the shaft. When thereafter the bar 1 is moved to the left from the position shown the detent 4 is released for a half revolution being then arrested by left hand projection of the detent lever 2. During this half revolution the cam 6 moves a double armed lever 7 to which is fixed an arm 8. On the end of the arm 8 is a toothed arc 9 meshing with an arc 10 rotatably mounted on the shaft 11. Attached to the arc 10 is a planet wheel 12 which meshes with an inner sun wheel 14 and with an outer sun wheel 13. The latter takes the form of an arc provided with teeth on its inner side and carried on a spider 15 rotatably mounted on the shaft 11.

Figure 3 shows a plan view of several gear units forming part of the complete train of gears for a selecting mechanism in a type printing receiver. The first inner sun wheel 14 of the train of gears is held stationary or may be given an occasional rotation in the manner described with reference to Figure 1 of the accompanying drawings. The spider 15 to which the outer sun wheel 13 is attached, has attached thereto the inner sun wheel 14' of the next gear unit.

Three arms 8, 8', 8'' only are shown but it will be understood that there are as many of these arms as there are elements in the complete signal. The last outer sun wheel is then attached to the indicating member.

Each arm such as 8, 8' or 8'' is actuated as shown in Fig. 2 from a bar such as 1 through a cam released for a half revolution by each movement of the bar. Movement of the bar in either direction causes a rotation of the gearing in the appropriate sense.

What is claimed is:

Telegraphic reproducing apparatus comprising an impulse recording member adapted to be moved into one or other of two positions, a detent lever, means for moving the said detent lever on each movement of said impulse recording member, a cam and driving means therefor, means for releasing said cam to allow it to be rotated for a half revolution only on each movement of said detent lever, a planet wheel, means responsive to the movement of the said cam to rotate said planet wheel by a predetermined amount, inner and outer sun members meshing with said planet wheel, an indicating member and means for moving said indicating member by a movement of said outer sun member.

RONALD GEORGE GRIFFITH.